United States Patent [19]

Blosser et al.

[11] 3,834,799

[45] Sept. 10, 1974

[54] MICROFICHE STORAGE AND DISPLAY UNIT

[75] Inventors: Robert L. Blosser, Bountiful; William D. Cranney, Granger, both of Utah

[73] Assignee: Sperry Rand Corporation, New York, N.Y.

[22] Filed: July 17, 1972

[21] Appl. No.: 272,233

Related U.S. Application Data

[63] Continuation of Ser. No. 71,534, Sept. 11, 1970, abandoned.

[52] U.S. Cl. .................................... 353/27, 271/74

[51] Int. Cl. ...................... G03b 23/08, B65h 29/24

[58] Field of Search ................................ 353/25–27; 271/8 R, 74 FC

[56] References Cited

UNITED STATES PATENTS

| | | | |
|---|---|---|---|
| 3,196,740 | 7/1965 | Beauchamp et al. | 353/25 |
| 3,384,970 | 5/1968 | Avalear | 33/189 |
| 3,528,735 | 9/1970 | Bluitt et al. | 353/27 |

*Primary Examiner*—Louis R. Prince
*Assistant Examiner*—Steven L. Stephan
*Attorney, Agent, or Firm*—Kenneth T. Grace; Thomas J. Nikolai; J. P. Dority

[57] ABSTRACT

A fluidic system for transporting a selected one of a plurality of microfiche from a storage cassette into position in an X-Y positioner for projection upon a viewing screen and return to the storage cassette. Air jets position the microfiche in the X-Y positioner during the positioning operation.

11 Claims, 24 Drawing Figures

INVENTORS
ROBERT L. BLOSSER
WILLIAM D. CRANNEY

BY Kenneth S. Grace
ATTORNEY

MICROFICHE STORAGE AND DISPLAY UNIT

CROSS REFERENCE TO RELATED APPLICATION

The present application is a continuation application of the parent application Ser. No. 71,534, filed Sept. 11, 1970, now abandoned.

BACKGROUND OF THE INVENTION

The present invention relates to the storage and retrieval of one of a plurality of microfiche for the optical display of one of a plurality of micro-images, or frames, arranged in rows and columns thereon. Microfiche display units for the positioning and display of a selected one of the micro-images, or frames, thereon upon a viewing screen have in the past been limited to devices for the handling and reception of a single microfiche. The single microfiche is usually manually inserted in an X-Y positioner for the orientation of a selected micro-image, or frame, thereon into the optical axis of a viewing system associated therewith. Keyboard inputs manually control mechanisms that incrementally index the X-Y positioner for viewing the one selected micro-image. Automatic indexing may also be provided for sequentially positioning the ordered or sequenced micro-images. Some typical prior art microfiche display units are shown in the S. F. Coil et al. U.S. Pat. No. 3,442,586; M. C. Gross et al. U.S. Pat. No. 3,443,552; and R. A. Halberg et al. U.S. Pat. No. 3,472,585.

SUMMARY OF THE INVENTION

The storage and retrieval system of the present invention includes a gas transporting medium for moving a microfiche from a storage cassette into position in an optical projection system and for returning it to the storage cassette. The one selected microfiche is released from the storage cassette by a keyboard addressing scheme and is transported in an air jet stream into an X-Y positioner which is positioned vertically and/or horizontally so as to orient the one desired frame, or micro-image, on the one selected microfiche into alignment with the optical axis of the associated optical projection system. Air jets maintain the microfiche in the X-Y positioner during X-Y positioning to ensure reliable microfiche positioning.

DESCRIPTION OF THE PREFERRED EMBODIMENT

Figure 1:
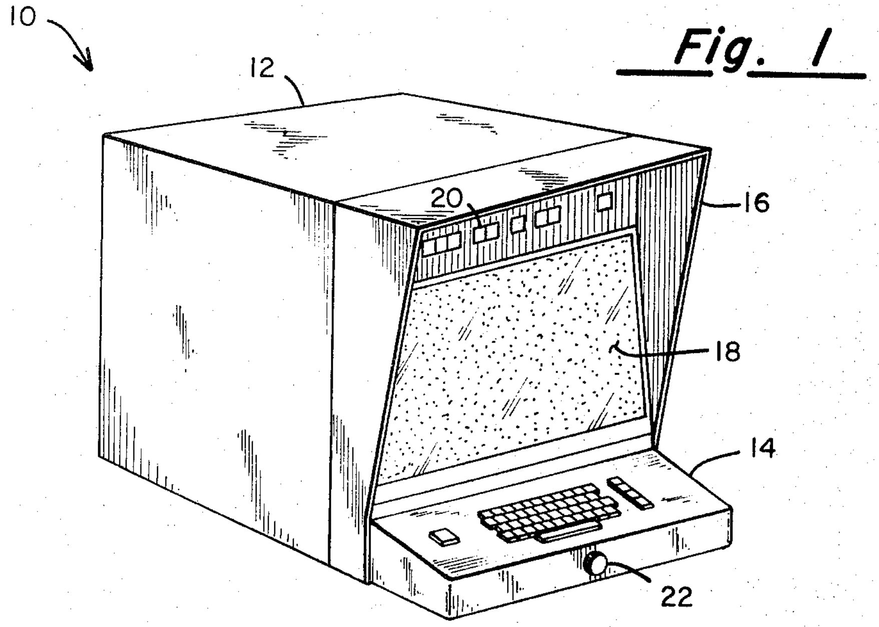
FIG. 1 is a perspective view of a microfiche storage and display unit that incorporates the present invention.

With particular reference to FIG. 1 there is presented a perspective view of a Microfiche Storage and Display Unit 10 that incorporates the present invention. Unit 10 includes a body 12 having a keyboard 14 and a hood 16 mounted on the front portion thereof. Hood 16 encloses a viewing screen 18 and additional indicator lights 20 mounted thereabove for indicating the particular microfiche and frame thereof that is being projected upon viewing screen 18, under control of focus control 22, in response to addressing data keyed into keyboard 14.

Figure 2:
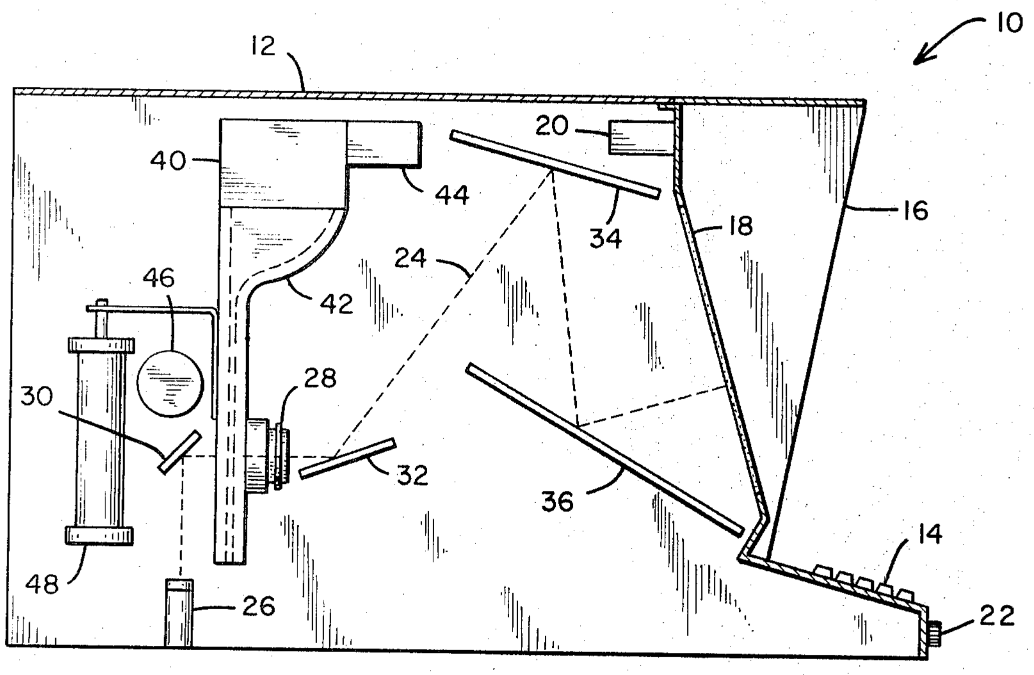
FIG. 2 is a side view, with the side panels removed, of the microfiche storage and display unit of FIG. 1 providing a diagrammatic illustration of the fixed optical projection system.

With particular reference to FIG. 2 there is presented a side view, with the side panels removed, of unit 10 providing a diagrammatic illustration of an optical projection system for projecting an enlarged image of one selected frame of one selected microfiche upon viewing screen 18. As the projection system of unit 10 is not a part of the present invention it is shown only diagrammatically for orienting the optical axis 24 of the light beam that is provided by light source 26. The light beam, from light source 26 and mirror 30, passes through the one selected frame on the one selected microfiche, as determined by an X-Y positioner, that is positioned by X actuator 46 and Y actuator 48, through lens 28, from which it is reflected by mirrors 32, 34, 36 upon viewing screen 18.

The projected microfiche is a selected one of a plurality of microfiche that are stored in storage cassette 40 and that are transported to and from an X-Y positioner that is slideably supported by means of fluidic transporter 42. By means of keyboard 14, data representative of binary coded notches in the microfiche that are stored in cassette 40 are translated by a control module causing the code pins in cassette 40 to be actuated by actuators 44 so as to permit the one selected microfiche to pass down into fluidic transporter 42 and thence into the X-Y positioner. Such cassette and code pin arrangement may be similar to that of the L. E. Gerlach, et al., U.S. Pat. No. 3,669,262.

Figure 3:
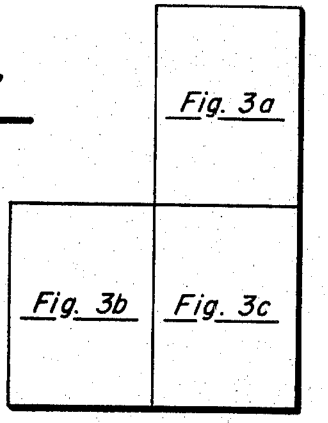
FIGS. 3*a*, *b*, *c*, when arranged as in FIG. 3, are a back view of the microfiche storage and display unit of FIG. 1 providing a detailed view of the storage cassette, transporter and positioner arrangement of the present invention.
Figure 3A:
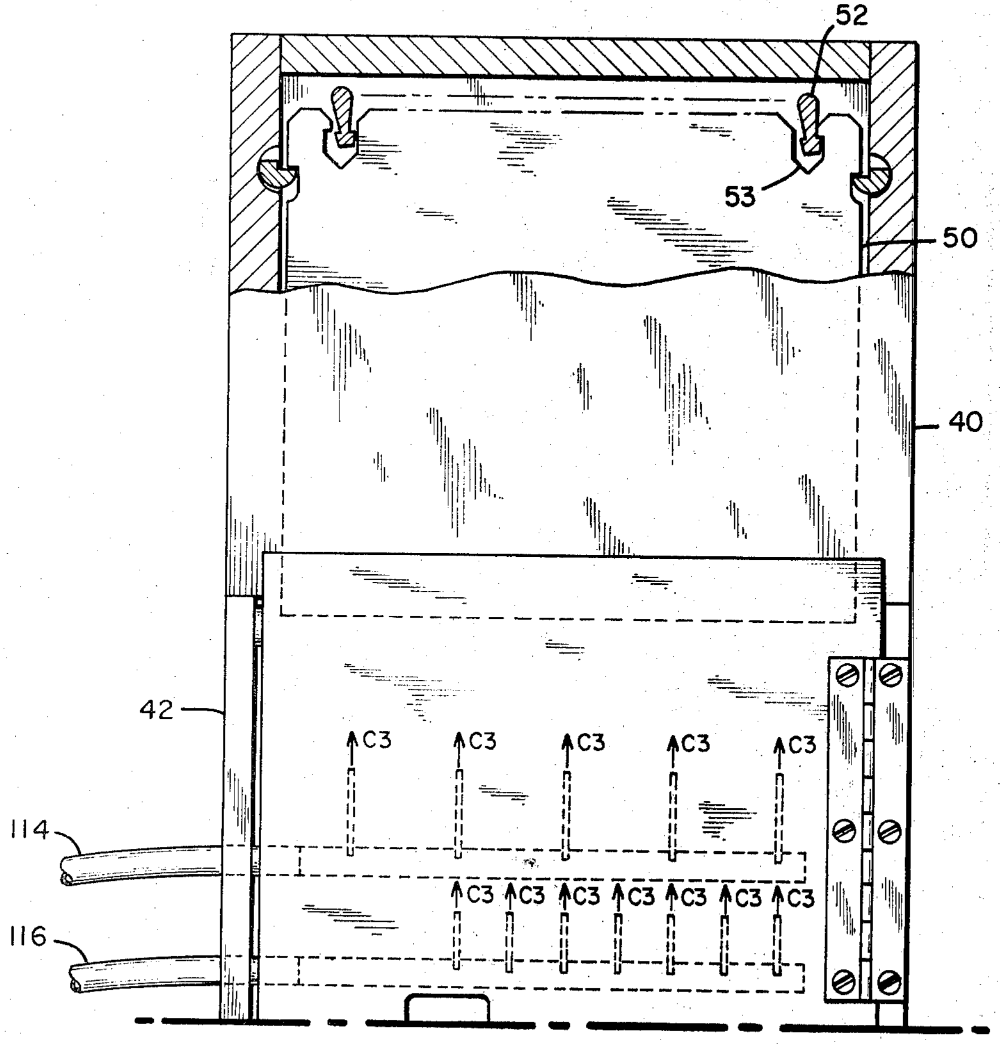

With particular reference to FIGS. 3*a*, *b*, *c*, when arranged according to FIG. 3, there is presented a rear view of unit 10 of FIG. 1 providing a detailed view of the storage cassette, fluidic transporter and X-Y positioner of the present invention. Unit 10 is illustrated as having a storage cassette 40 in which a plurality of microfiche 50, which are supported by a plurality of code pins 52 that are controlled by actuators 44 in response to keyboard 14, are selectively passed down into fluidic transporter 42. Fluidic transporter 42 includes a plurality of downwardly directed A1 air jets — see FIGS. 4*a*, *b* — that accelerate the one selected microfiche 50 into an X-Y positioner 54 which is slideably restrained in a vertical direction by means of fingers 56, 68 and 60, 62 of X-Y positioner 54 that slideably engage with rectangular openings 64, 65 and 66, 67, respectively, of fluidic transporter 42. Microfiche 50 is positioned in the bottom of X-Y positioner 54 and along its left-hand edge against X positioning block 68 by A2 air jets. X positioning block 68 is positioned in the X, or horizontal, dimension by means of a post 70 which is slideably restrained in a Y, or vertical, dimension by means of bracket 72 which is coupled to the actuating piston of X actuator 46. X positioning block 68, under the influence of bracket 72 is slideably moved along slot 74 in the back panel of X-Y positioner 54. Bracket 76, by means of a plurality of screws 78 and a spacer block 140 — see FIG. 11 — is rigidly attached to the rear panel of X-Y positioner 54 while the backward projection thereof — see FIG. 4 — is coupled to the actuating piston of Y actuator 48. The couplings of the X actuator 46 and the Y actuator 48 to the associated brackets 72 and 76 will be illustrated in more detail in FIGS. 5 and 6.

With the one selected microfiche 50 being positioned in X-Y positioner 54 along its left-hand edge by block 68 under the influence of A2 air jets, a pressure pad 80, through its lever arm 82 and linkage 84, is controlled by means of pressure pad actuator 86 to be pressed against the back surface of microfiche 50 holding microfiche 50 in a securely positioned relationship with the front panel of X-Y positioner 54. Thus, pressure pad 80 ensures that microfiche 50 is securely restrained in X-Y positioner 54 to ensure a reliable, in focus projection of the one selected frame upon viewing screen 18.

With microfiche 50 in the X-Y positioner 54, the selection of a different one of the many frames upon the one selected microfiche 50 is accomplished through the operation of the X actuator 46 and Y actuator 48 acting upon their associated brackets 72 and 76, respectively. As an example, if the next selected frame on microfiche 50 is the next adjacent right-wise frame as viewed from FIGS. 3*a*, *b*, *c*, X actuator 46 is controlled to move its associated bracket 72 one frame increment left-wise. Bracket 72, accordingly, pushes post 70 and, accordingly, block 68 one frame width or increment to the left while, concurrently, A2 air jets maintain the left-hand edge of microfiche 50 against the right-hand edge of block 68. Alternatively, if the next one selected frame is the next adjacent left-wise frame from the selected frame, X actuator 46 would move its associated bracket 72 one frame increment right-wise causing block 68 to push microfiche 50 right-wise the desired one frame width distance while air jets A2 maintain microfiche 50 against the right-hand edge of block 68 during the X positioning operation. It is to be appreciated, of course, that during the X-Y positioning operation pressure pad 80 is released, it applying pressure to the one selected microfiche 50 only between the X-Y positioning operations — see FIG. 18.

If, in contrast to the above described X positioning operation, a Y positioning operation is desired, such as to view the frame immediately below the presently selected frame on microfiche 50, Y actuator 48 is controlled to push up on bracket 76 whereupon the X-Y positioner 54 is moved upwardly one frame length increment. In the Y positioning operation, X-Y positioner 54 is slideably restrained by its fingers 56, 58 and 60, 62 in rectangular openings 64, 65 and 66, 67 respectively, while post 70 of block 68 is permitted to move vertically in an unrestrained fashion between the two opposing plates of bracket 72 of X actuator 46. As in the X positioning, A2 air jets maintain the left-hand edge of microfiche 50 against the right-hand edge of block 68 and the bottom edge of microfiche 50 against the bottom of X-Y positioner 54.

Upon return of the microfiche 50, presently held in X-Y positioner 54, to cassette 40, pressure pad 80 is released; B1, B2 air jets move microfiche 50 in a right-wise direction maintaining microfiche 50 against the bottom of X-Y positioner 54 ensuring unhindered right-wise passage of the microfiche 50 into contact with the restraining surface 90 formed by the inside surface of the right-hand panel of fluidic transporter 42. C1 air jets then carry microfiche 50 upwardly into the vicinity of C2 air jets which carry microfiche 50 still further upwardly into C3 air jets. C3 air jets accelerate the fluidic transport of microfiche 50 upwardly into the back area of cassette 40 whereby microfiche 50 is carried up into the area of code pins 52 which engage the corresponding notches 53 of microfiche 50 holding it in a securely positioned relationship for storage.

Retrieval of the next selected microfiche 50 is accomplished as described hereinabove wherein actuators 44, under the control of keyboard 14, selectively actuate their associated code pins 52 releasing the one selected microfiche 50 which, through gravity, falls downwardly into the influence of the A1 air jets which cause the one selected microfiche 50 to be carried into X-Y positioner 54 whereupon the A2 air jets position microfiche 50 against the right-hand edge 164 — see FIG. 13 — of block 68 and the bottom of X-Y positioner 54.

Figure 4:
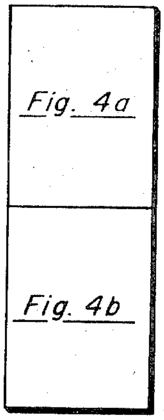
FIGS. 4*a*, *b*, when arranged as in FIG. 4, are a side view of the microfiche storage and display unit portion illustrated in FIGS. 3*a*, *b*, *c*.
Figure 4A:
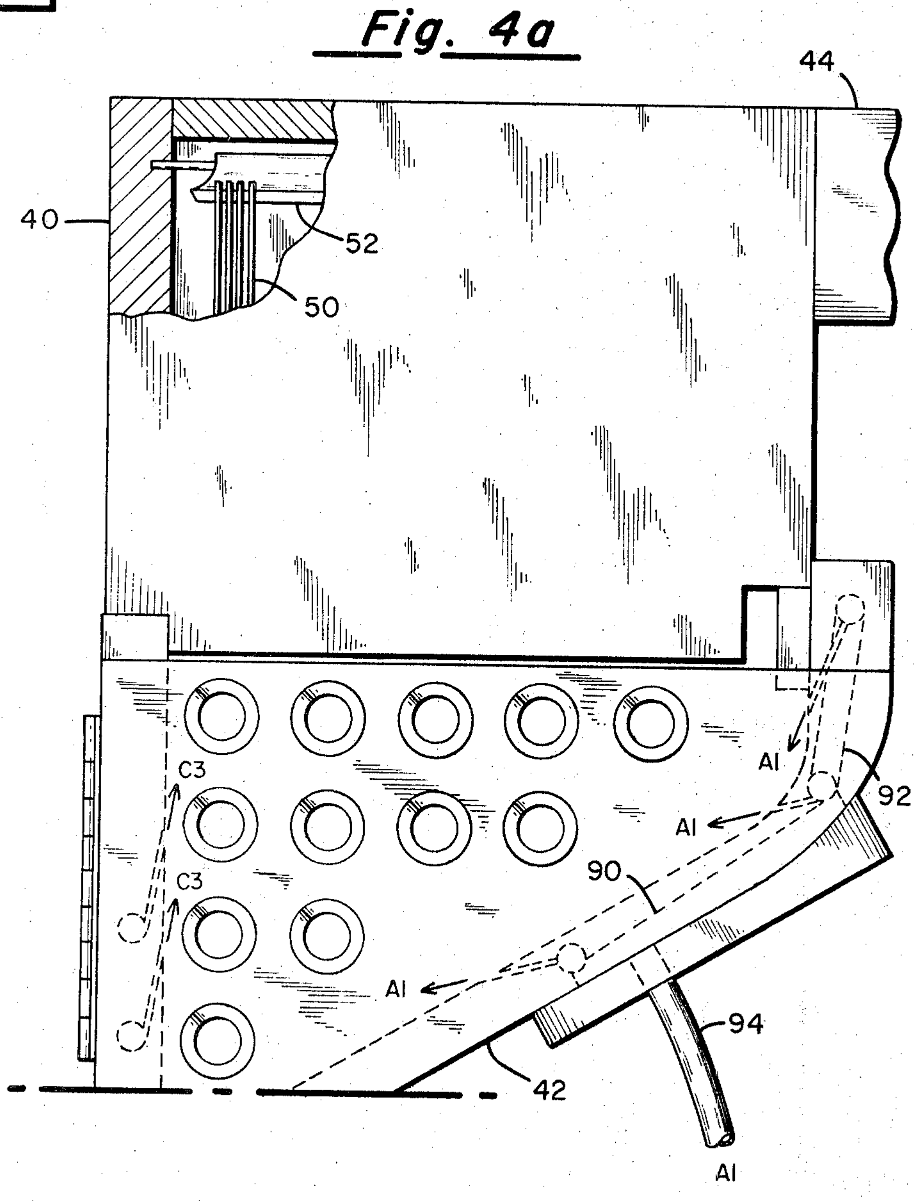
Figure 4B:
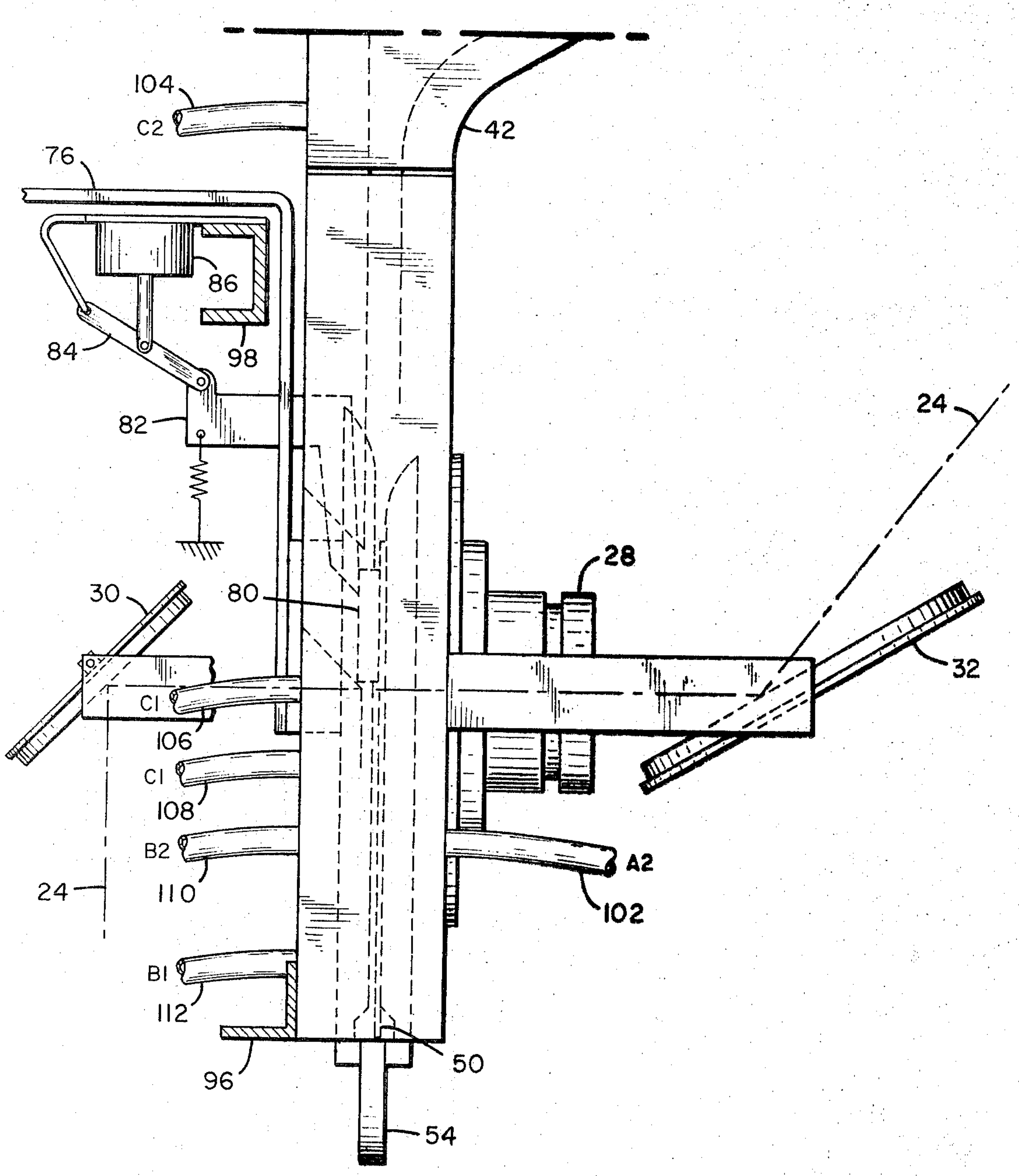

With particular reference to FIGS. 4*a*, *b*, when arranged according to FIG. 4, there is presented a side view of unit 10 of FIG. 1 providing a detailed view of the storage cassette 40, fluidic transporter 42 and X-Y positioner 54 previously discussed with reference to FIGS. 3*a*, *b*, *c*. This view illustrates the manner in which the plurality of microfiche 50 are coupled to the plurality of code pins 52 which, under control of actuators 44, selectively release the one selected microfiche 50, or capture the one returned microfiche 50. This view shows to a better advantage the relationship of the access A1 air jets and the return C3 air jets with respect to the microfiche 50 and the fluidic transporter 42 whereby the one selected microfiche 50 is caused to pass down into the X-Y positioner 54 during the access cycle and to pass from the X-Y positioner 54 into the cassette 40 during the return cycle. This view illustrates how A1 air jets are coupled to the fluid source through A1 fluid channels 90, 92 and A1 fluid tubing 94 under control of keyboard 14. Also illustrated are L channel 96, utilized for supporting the bottom end of fluidic transporter 42, and C channel 98, utilized for supporting pressure pad actuator 86 and bracket 100, which, in turn, supports the top end of Y actuator 48. Also illustrated are: A2 fluid tubing 102 coupled to the front panel of X-Y positioner 54; C2 fluid tubing 104 coupled to the back panel of fluidic transporter 42; and, C1 fluid tubing 106, C1 fluid tubing 108, B2 fluid tubing 110, and B1 fluid tubing 112, all on the back panel of X-Y positioner 54 with all such fluid tubings selectively coupled to a fluid source under control of keyboard 14.

Figure 5:
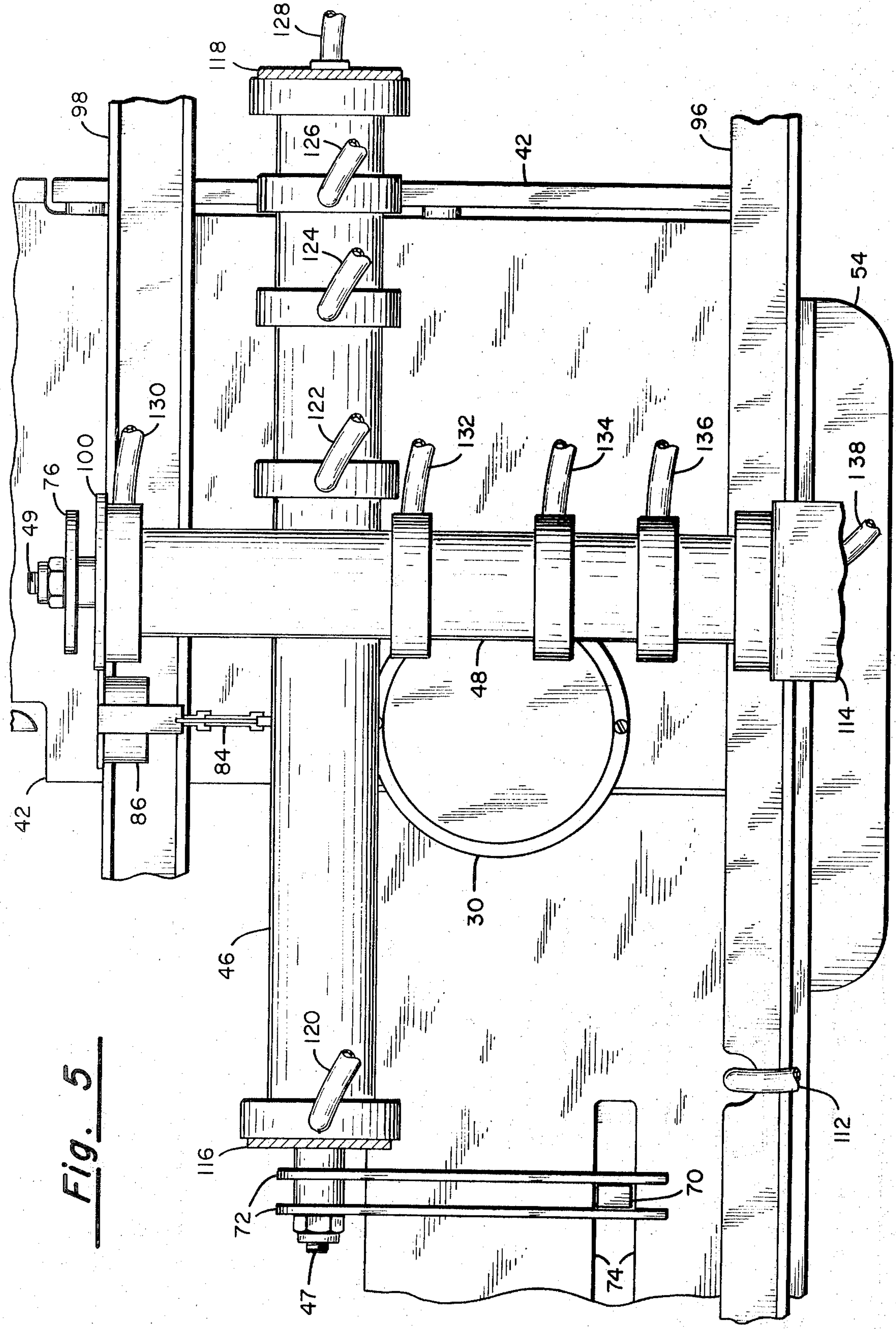
FIG. 5 is a back view of the microfiche storage and display unit of FIG. 1 providing a detailed view of the X actuator, Y actuator arrangement.

With particular reference to FIG. 5 there is presented a back view of unit 10 of FIG. 1 providing a detailed view of the X actuator, Y actuator arrangement of the present invention. This view illustrates the manner in which Y actuator 48 is rigidly fixed, on both ends, by bracket 100 to C channel 98 and by bracket 114 to L channel 96 while X actuator 46 is rigidly attached to structure, not illustrated, by brackets 116, 118. Also illustrated are the X actuator fluid tubings 120, 122, 124, 126 and 128, which are selectively coupled to a fluid source under control of keyboard 14, whereby post 70 of block 68 is moved in a left and right direction by means of bracket 72 when properly affected by keyboard 14. Additionally illustrated are Y actuator fluid tubings 130, 132, 134, 136 and 138, which are selectively coupled to a fluid source under control of keyboard 14 and which, by means of bracket 76, cause Y actuator 48 actuating piston 49 to move X-Y positioner 54 in a vertical direction when properly affected by keyboard 14.

Figure 6:
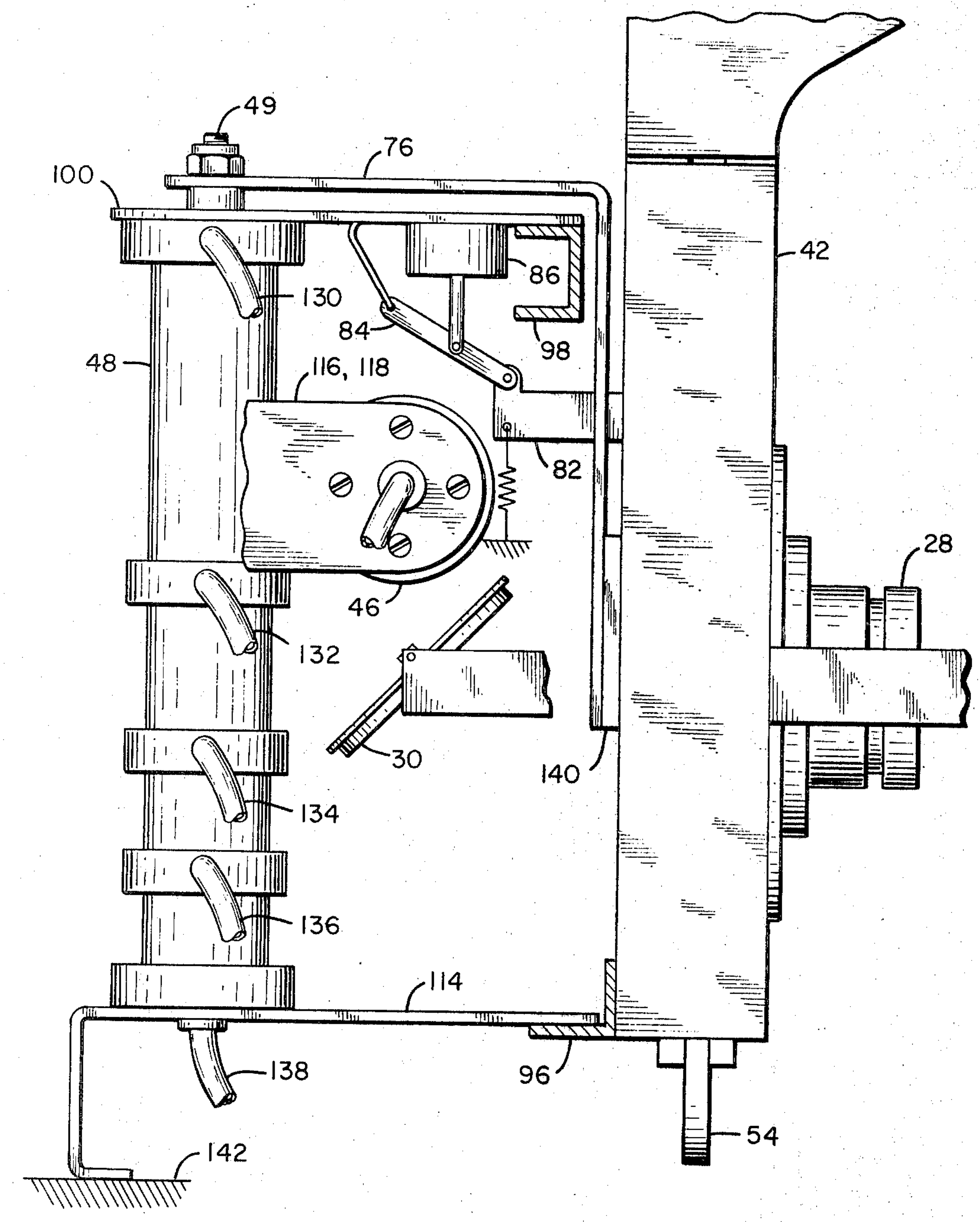
FIG. 6 is a side view of the X actuator, Y actuator arrangement of FIG. 5.

With particular reference to FIG. 6 there is presented a side view of unit 10 of FIG. 1 providing a detailed view of the X actuator, Y actuator arrangement of the present invention. This view illustrates, in more detail, the manner in which bracket 76 couples actuating piston 49 of Y actuator 48 to the back panel of X-Y positioner 54 by means of a block spacer 140 — see FIG. 11 — while providing operating clearance between C channel 98 and fluidic transporter 42 in its rectangularly shaped opening 64 — see FIG. 14. Also illustrated are the means whereby bracket 100 couples the top end of Y actuator 48 to C channel 98 and bracket 114 couples the bottom end of Y actuator 48 to L channel 96 and another structural member 142. This view illustrates the relationship of X actuator 46 and its supporting brackets 116, 118 and their relationship with Y actuator 48 and the other illustrated elements of unit 10.

Figure 8:
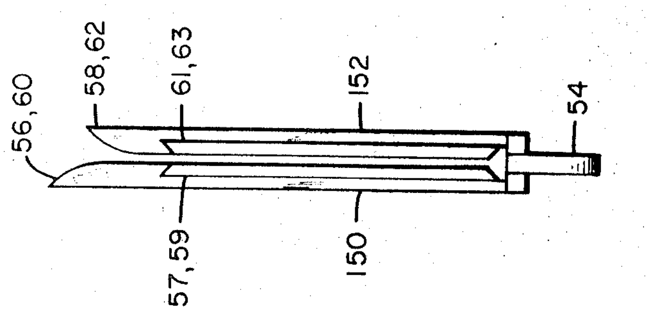
FIG. 8 is a side view of the X-Y positioner of FIG. 7.
Figure 7:
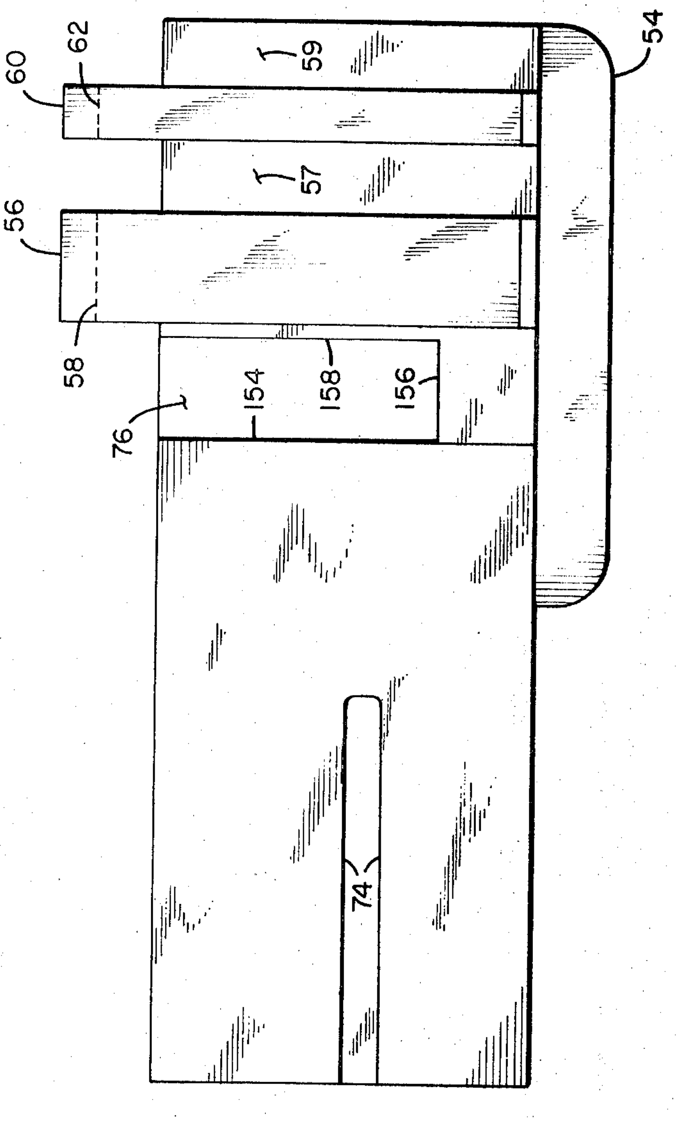
FIG. 7 is a back view of the X-Y positioner of the present invention.

With particular reference to FIGS. 7 and 8 there are illustrated back and side views of X-Y positioner 54. These views illustrate opposing back and front fingers 56, 60 and 58, 62 that are slideably engaged with back and front rectangular openings 64, 66 and 65, 67 in the respectively associated back and front panels 42*a*, 42*b* of fluidic transporter 42 for permitting X-Y positioner 54 to move in a freely sliding manner in a vertical direction. Also illustrated is the slot 74 in back panel 150 whereby post 70 of block 68 is freely moved in a left-right X direction by means of bracket 72 and X actuator 46. Also illustrated is the opening 76 in back panel 150, defined by edges 154, 156 and 158, which permits the clearance of pressure plate 80 during the vertical movement of X-Y positioner 54.

Figure 3B:
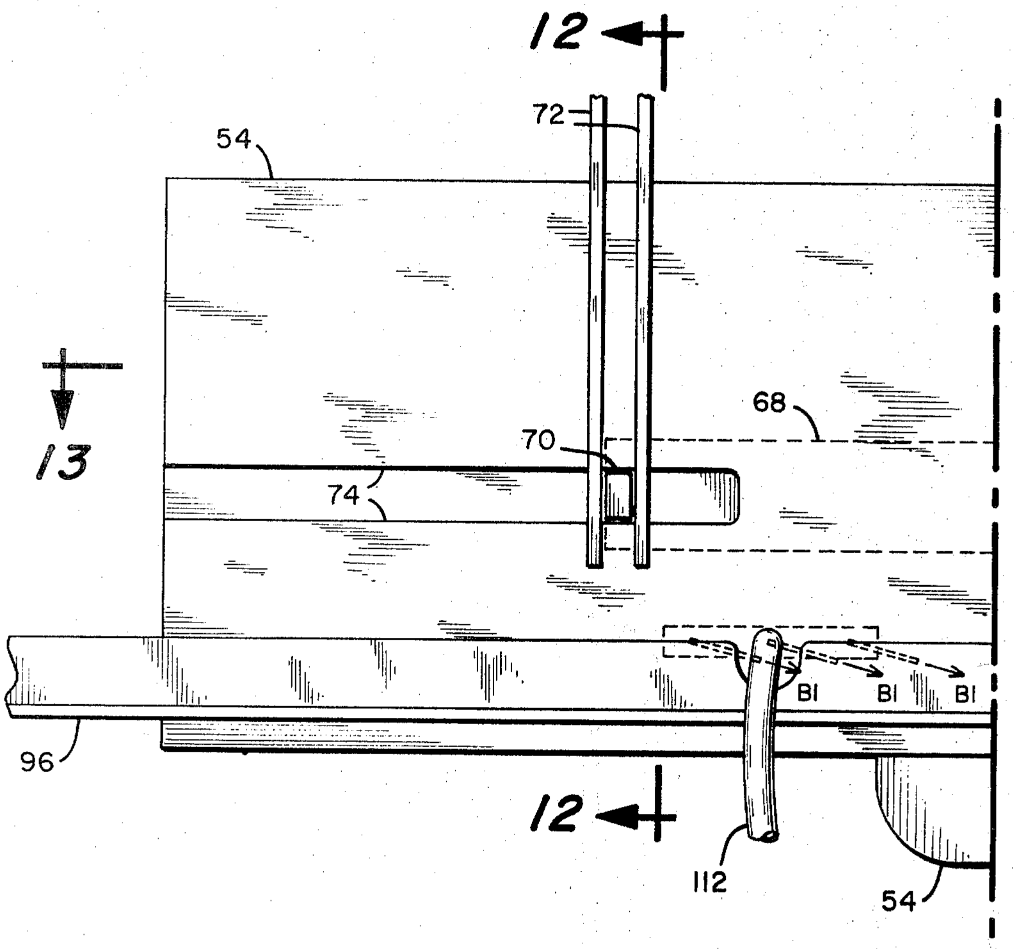
Figure 3C:
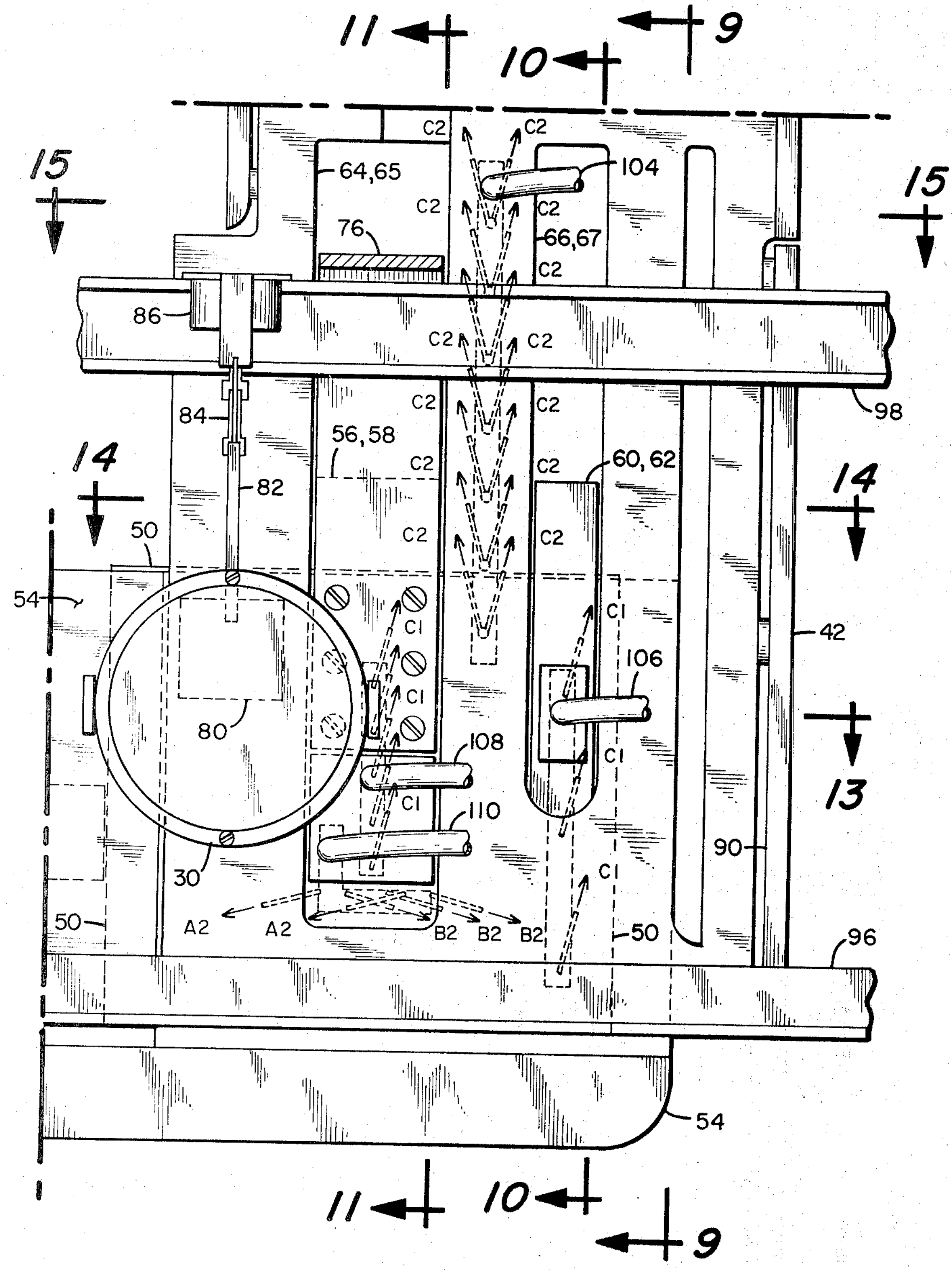
Figure 9:
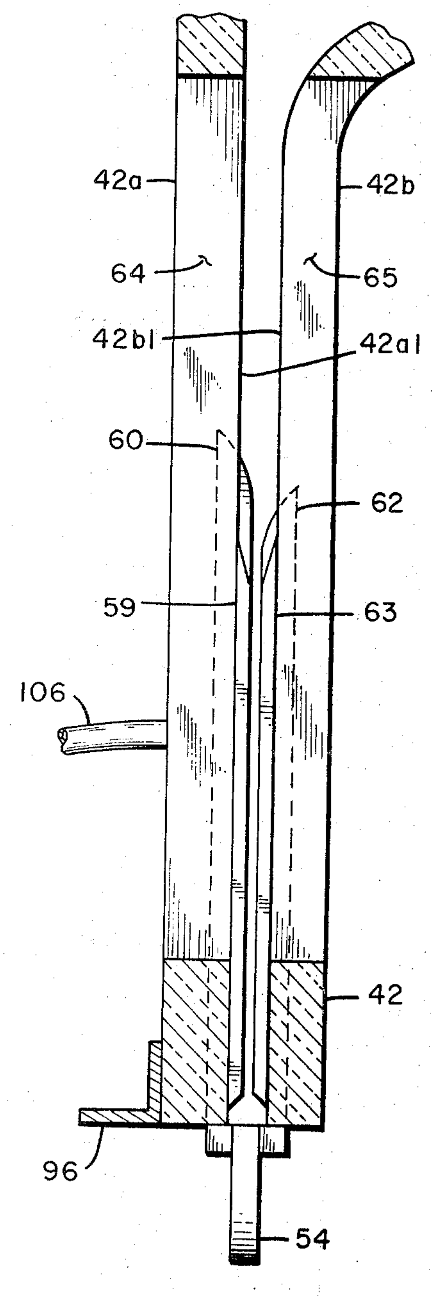
FIG. 9 is a sectional view of the X-Y positioner, fluid transporter of FIGS. 3*a*, *b*, *c* taken along line 9—9.
Figure 10:
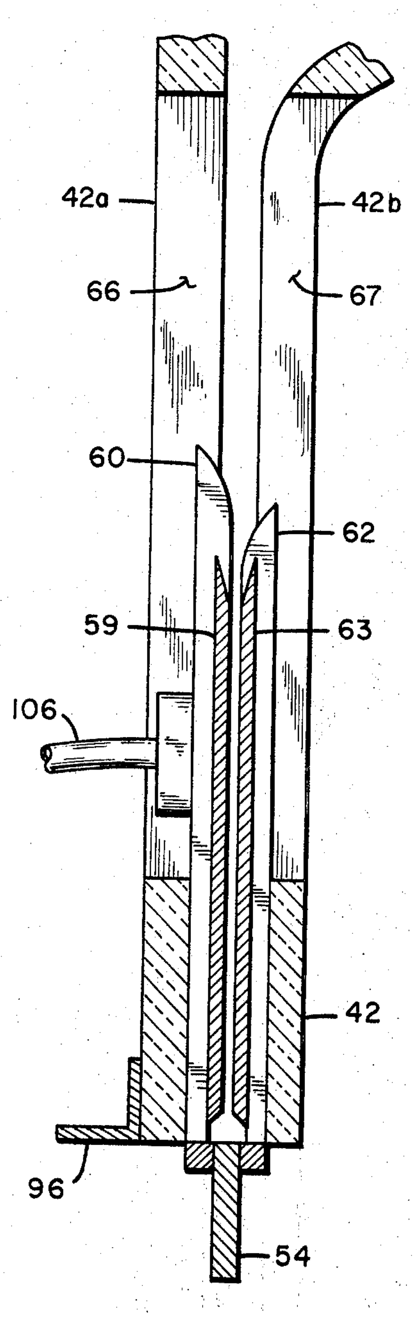
FIG. 10 is a sectional view of the X-Y positioner, fluid transporter of FIGS. 3*a*, *b*, *c* taken along line 10—10.
Figure 11:
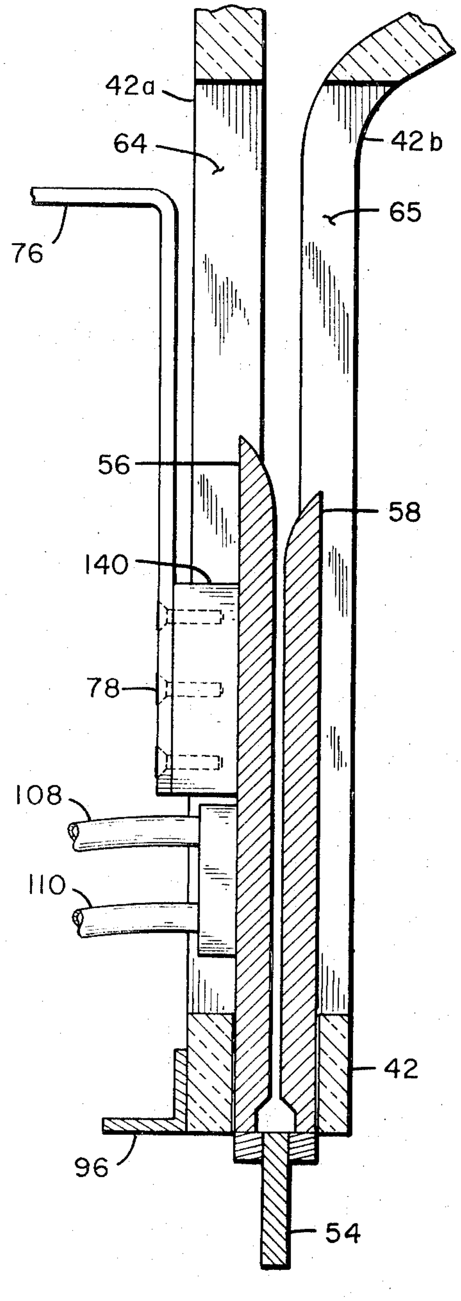
FIG. 11 is a sectional view of the X-Y positioner, fluid transporter of FIGS. 3*a*, *b*, *c* taken along line 11—11.
Figure 12:
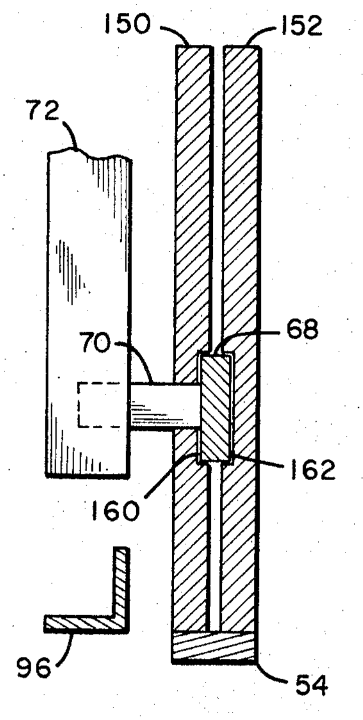
FIG. 12 is a sectional view of the X-Y positioner, fluid transporter of FIGS. 3*a*, *b*, *c* taken along line 12—12.

With particular reference to FIGS. 9, 10, 11, 12 there are presented sectional views of the microfiche storage and display unit 10 of the present invention taken along lines 9—9, 10—10, 11—11, 12—12, respectively, of FIGS. 3*b*, *c* for the purpose of better illustrating the interrelation of the mechanical components of X-Y positioner 54, detailed in FIGS. 7, 8 and fluidic transporter 42. FIG. 9 illustrates the manner in which the outside surfaces of lands 57, 59 of back panel 150 and of lands 61, 63 of front panel 152 of X-Y transporter 54 ride along the inside surfaces 42a1 and 42b1 of back and front panels 42*a* and 42*b* respectively, of fluidic transporter 42 while being constrained by fingers 56, 60 and 58, 62 in openings 64, 66 and 65, 67 in the back and front panels 42*a* and 42*b*, respectively, of fluidic transporter 42. FIG. 10 particularly illustrates the manner in which back and front fingers 60 and 62 of X-Y positioner 54 ride within openings 66 and 67 of front and back panels 42*a* and 42*b*, respectively, of fluidic transporter 42. FIG. 11 particularly illustrates the manner in which bracket 76 is coupled to the back finger 56 of X-Y positioner 54 by means of a plurality of screws 78 and spacer block 140, which spacer block 140 and finger 56 ride freely within the opening 64 of back panel 42*a* of fluidic transporter 42 — see FIG. 14. FIG. 12 particularly illustrates the manner in which block 68 rides freely within the grooves 160 and 162 in the back and front panels 150 and 152, respectively, of X-Y positioner 54 as controlled by X actuator 46 and bracket 72 acting upon post 70.

Figure 13:
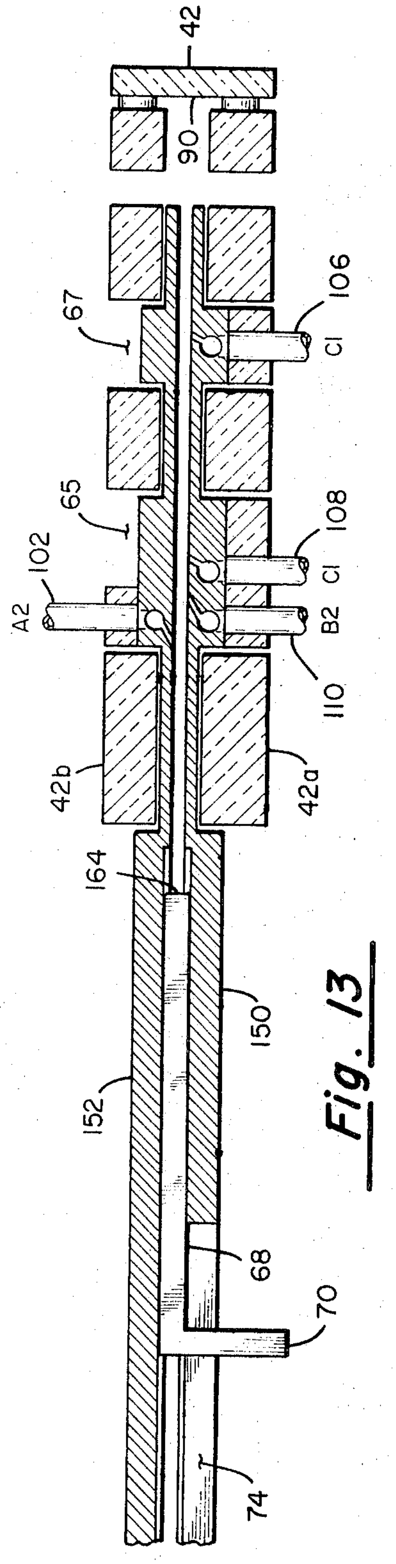
FIG. 13 is a sectional view of the X-Y positioner, fluid transporter of FIGS. 3*a*, *b*, *c* taken along line 13—13.
Figure 14:
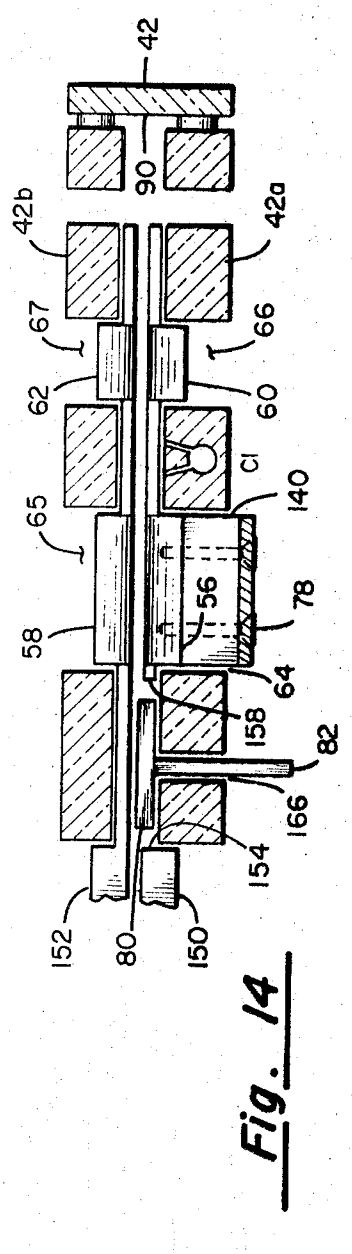
FIG. 14 is a sectional view of the X-Y positioner, fluid transporter of FIGS. 3*a*, *b*, *c* taken along line 14—14.
Figure 15:
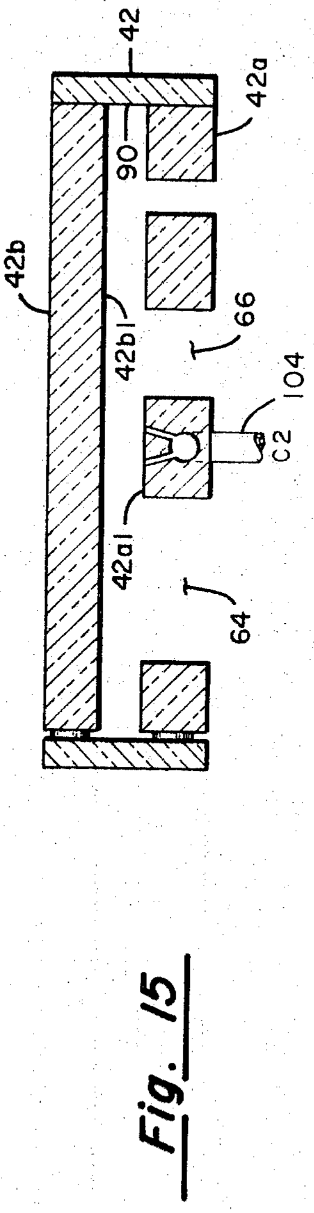
FIG. 15 is a sectional view of the X-Y positioner, fluid transporter of FIGS. 3*a*, *b*, *c* taken along line 15—15.

With particular reference to FIGS. 13, 14, 15 there are presented sectional views of unit 10 taken along lines 13—13, 14—14, 15—15, respectively, of FIGS. 3*b*, *c* for the purpose of better illustrating the interrelation of the mechanical components of X-Y positioner 54 and fluidic transporter 42. FIG. 13 illustrates the manner in which B2 fluid tubing 110 and C1 fluid tubings 106, 108 couple the associated fluid sources to the associated B2 air jets and C1 air jets emitted from the inside face of back panel 150 and A2 fluid tubing 102 couples its associated fluid source to the associated A2 air jets which are emitted from the inside face of front panel 152 of X-Y positioner 54. Also illustrated are the right-most stop 90 of a microfiche 50 when influenced by the C1 and C2 air jets during a storage, or return, cycle and the left-most stop 164 of a microfiche 50 which stop is the right-hand edge 164 of block 68 when a microfiche 50 is influenced by the A2 air jets. FIG. 14 particularly illustrates the manner in which fingers 56 and 60 are slideably restrained by openings 64 and 66, respectively, in back panel 42A of fluidic transporter 42 and how the fingers 58 and 62 are slideably restrained by openings 65 and 67 in front panel 42b of fluidic transporter 42. Also illustrated is the means whereby pressure plate 80 lever arm 82 is passed through an opening 166 in back panel 42*a* of fluidic transporter 42 with the clearance in X-Y positioner 54 provided by the opening 76 defined by edges 154, 156, 158 — see FIG. 7. FIG. 15 is presented to illustrate the general conformation of fluidic transporter 42 below the C3 air jets and above X-Y positioner 54 — see FIG. 3*a* — and the manner in which C2 fluidic tubing 104 couples the associated fluid source to C2 air jets which are emitted from the internal surface 42a1 of back panel 42*a* of fluidic transporter 42.

Figure 16:
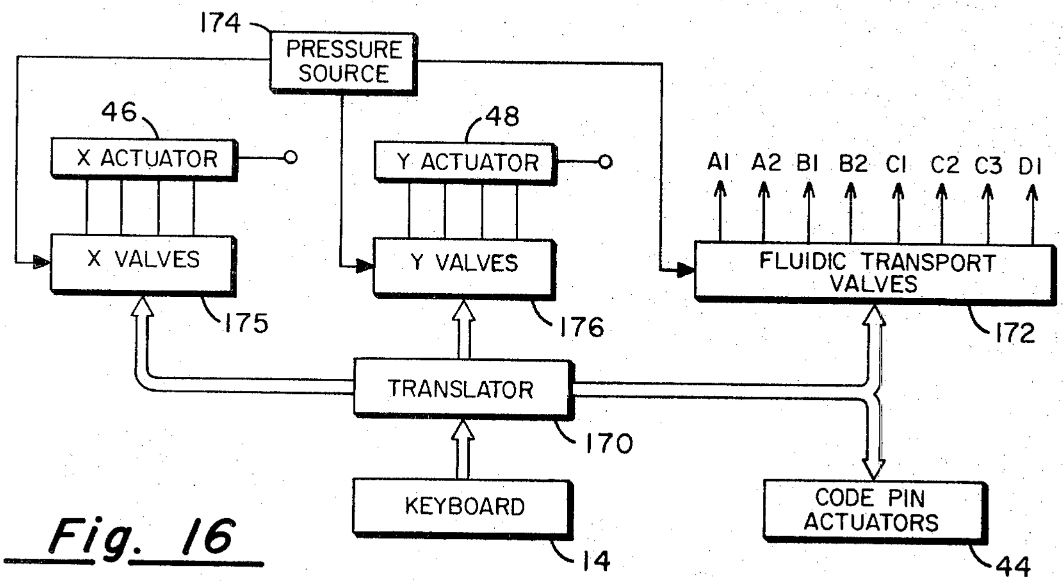
FIG. 16 is a block diagram of the fluidic system of the present invention.
Figure 17:
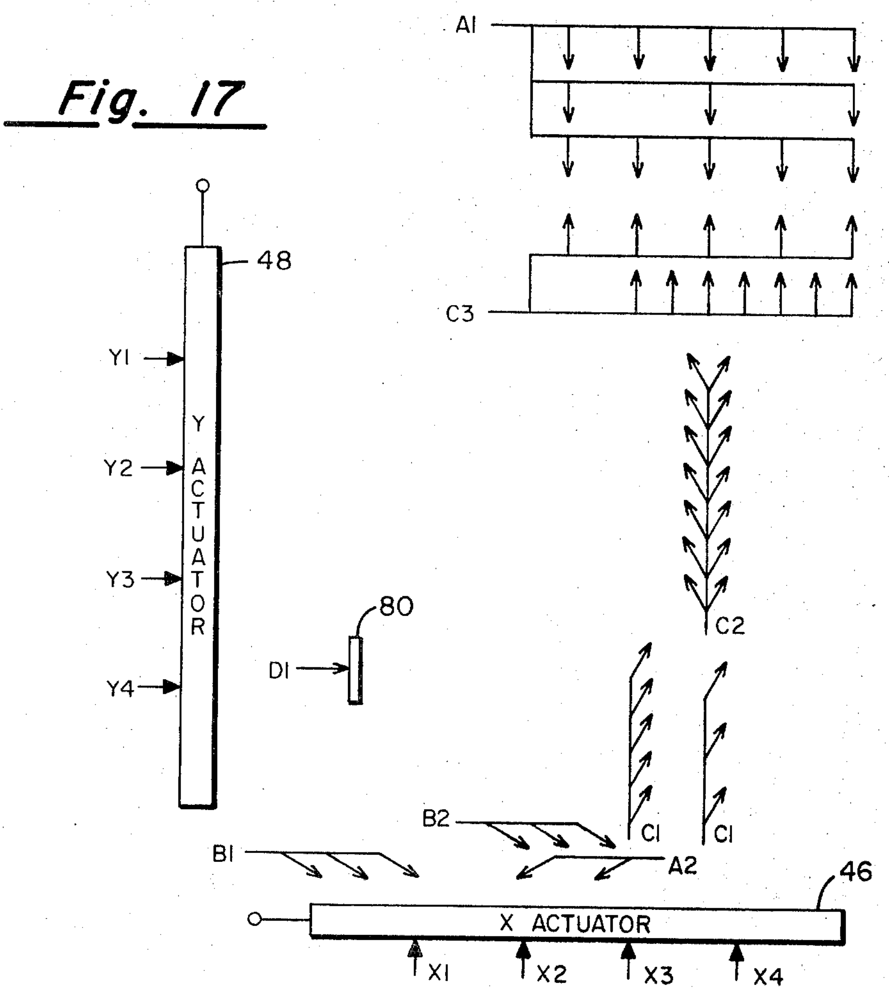
FIG. 17 is a diagrammatic illustration of the air jets and actuators of the present invention.
Figure 18:
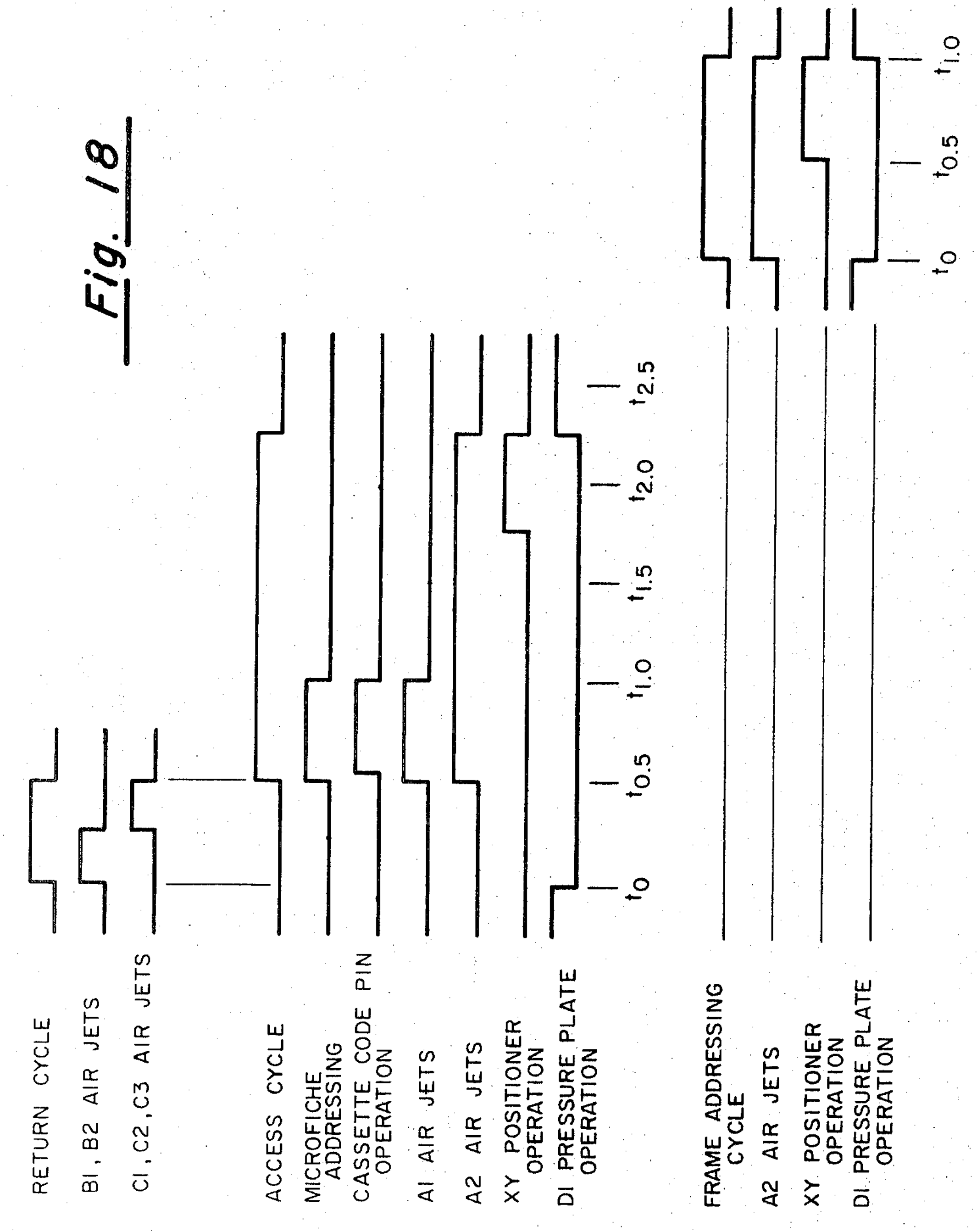
FIG. 18 is a timing diagram of the fluidic system of the present invention.

With particular reference to FIGS. 16, 17, 18 there are presented a block diagram of the fluidic system, a diagrammatic illustration of the air jets and actuators and a timing diagram of the fluidic system of the present invention. As illustrated in the block diagram of FIG. 16, keyboard 14, when activated by an operator keying in information representative of the one selected microfiche 50 that is to be selected from storage cassette 40 and to pass through fluidic transporter 42 into X-Y positioner 54, sends one or more electrical signals to translator 170. As illustrated in FIG. 18, translator 170 initially activates a return cycle, as at time $t_0$, wherein pressure plate operation is initiated by decoupling actuator 86 from pressure source 174, by fluidic transport valves 172, and wherein B1, B2 air jets, through fluidic transport valves 172, are coupled to pressure source 174 causing the microfiche 50 in X-Y positioner 54 to be moved right-wise against stop 90. Next, fluidic transport valves 172 couple C1, C2, C3 air jets to pressure source 174 whereby such air jets carry microfiche 50 up into storage cassette 40 to be captured by code pins 52 — see FIGS. 4*a, b.*

After cessation of the return cycle, as at time $t_{0\cdot5}$, translator 170 initiates an access cycle. A microfiche addressing operation is then initiated whereby fluidic transporter valves 172 couple pressure source 174 to A1, A2 air jets. After a slight delay, the cassette code pin operation is initiated whereby translator 170 activates code pin actuators 44 which, in turn, activate the particular associated code pins 52 permitting the one selected microfiche 50 to fall free therefrom and to be influenced by the A1 air jets. The A1, A2 air jets then cause the one selected microfiche 50 to pass down through fluidic transporter 42 into the bottom of X-Y positioner 54 and, particularly under the influence of A2 air jets, to be positioned along the right-most edge 164 of block 68 — see FIG. 13. Concurrently therewith, translator 170 has activated the selected X valves 175 and Y valves 176 causing X actuator 46 and Y actuator 48 to position block 68 for establishing the left-right X dimension position of microfiche 50 and to position X-Y actuator 54 for positioning microfiche 50 in the desired vertical position.

After completion of the X-Y positioner operation the access cycle is terminated whereupon the air jets are turned off and the pressure plate operation is initiated causing pressure plate 80 to press microfiche 50 against the inside face of front panel 152 of X-Y positioner 54. At this time, the one particular selected frame of the one particular selected microfiche 50 is then displayed upon viewing screen 18 as schematically illustrated in FIG. 2.

Subsequently, when it is desired that another frame, different than the frame presently being displayed upon viewing screen 18, is to be displayed, the operator, by means of keyboard 14, keys in addressing data representative of that one particular selected frame. Keyboard 14 couples one or more signals representative of the address of the one selected frame to translator 170 whereby a frame addressing cycle is initiated. Translator 170 activates fluidic transport valves 172 whereby pressure plate operation is initiated removing fluidic pressure from actuator 86 causing pressure plate 80 to free microfiche 50 and to couple A2 air jets to pressure source 174. Subsequently, as at time $t_{0\cdot5}$, translator 170 initiates the X-Y positioner operation by selecting the desired X valves 175 and Y valves 176 whereby X actuator 46 and Y actuator 48, through pressure source 174, establish a new left-hand stop of microfiche 50 by adjusting the left-right position of block 68 and/or by moving X-Y positioner 54 in a vertical Y direction whereby the newly selected frame on microfiche 50 is positioned within the optical axis of light beam 24. Finally, translator 170 terminates the frame addressing cycle whereby the A2 air jets are extinguished and fluidic pressure is again coupled to pressure plate 80 for maintaining microfiche 50 in the desired position in X-Y positioner 54. The one desired frame on X-Y positioner 54 is then displayed upon viewing screen 18 as schematically illustrated in FIG. 2.

Figure 19:
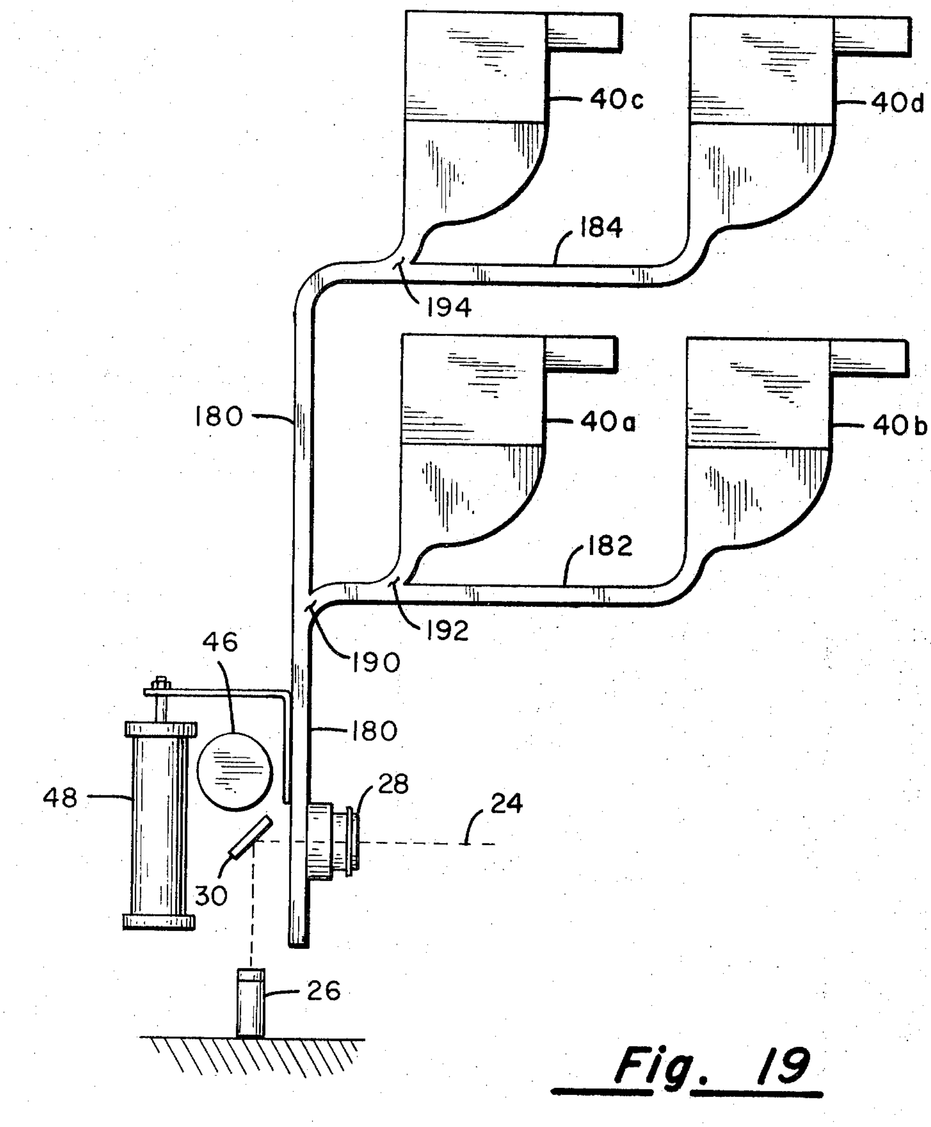
FIG. 19 is a side view of one possible arrangement of a plurality of storage cassettes fluidically coupled to the optical projection system of FIG. 2.

With particular reference to FIG. 19 there is presented a side view of one possible arrangement of a plurality of storage cassettes 40*a*, 40*b*, 40*c*, 40*d* that are fluidically coupled to the microfiche optical projection system of FIG. 2. In this arrangement, fluidic transporter 180 is coupled to fluidic transporters 182 and 184 each of which are, in turn, coupled to storage cassettes 40*a*, 40*b* and 40*c*, 40*d*, respectively. Fluidic transporter 180 includes a fluidic gate 190 while fluidic transporters 182 and 184 include associated fluidic gates 192 and 194, respectively, for fluidically switching the accessed and returned microfiche 50 from and to the respectively associated storage cassette; such fluidic gates may be of any well-known designs including that of the C. B. Albright U.S. Pat. No. 3,421,798 while air jets in fluidic transporters 180, 182, 184 may be similar to those of fluidic transporter 42 or of the R. S. Gluskin U.S. Pat. No. 3,437,335.

Addressing of one selected microfiche 50 from one of the storage cassettes 40*a*, 40*b*, 40*c*, 40*d* is activated by an operator keying in information in keyboard 14 that is representative of one of the storage cassettes 40*a*, 40*b*, 40*c*, 40*d* and the one selected microfiche 50 that is to be selected from the one selected storage cassette. Keyboard 14 sends one or more electrical signals to translator 170 activating the return cycle for the microfiche presently in X-Y positioner 54. Fluidic transport valves 172 activate the proper fluidic gates 190, 192, 194 causing the returned microfiche to be returned to its associated storage cassette and then activate the proper fluidic gates 190, 192, 194 causing the accessed microfiche to pass through fluidic transporter 180 into X-Y positioner 54; all other operations being similar to those discussed with respect to FIGS. 16, 17, 18.

It is apparent that there has been presented herein a novel gas transporting system for moving a microfiche from a storage cassette into position in an optical projection system and for returning it to the storage cassette. It has been shown that the one selected microfiche is released from the storage cassette by a keyboard addressing scheme and is transported in an air jet stream into an X-Y positioner which is positioned vertically and/or horizontally so as to orient the one desired frame or micro-image on the selected microfiche into alignment with the optical axis of the associated projection system. Also shown are air jets for maintaining the one selected microfiche in the X-Y positioner during X-Y positioning operation to ensure reliable microfiche positioning.

What is claimed is:

1. A microfiche storage and display unit, comprising:

storage means for storing a plurality of microfiche, each microfiche having a plurality of frames spaced in X horizontal direction rows and Y vertical direction columns, said storage means including selection means for selecting any one of said plurality of stored microfiche;

display means including a viewing screen and having an optical axis for displaying upon said viewing screen a selected one of the frames of the selected one of said microfiche;

X-Y positioning means for positioning said one selected frame of said one selected microfiche within said optical axis of said display means, said X-Y positioning means including X-Y positioning air jet means for carrying in a jet of air said one selected microfiche in said X horizontal direction and in said Y vertical direction within said X-Y positioning means to a position selected so that the selected frame is positioned within said optical axis;

access air jet means for carrying in a jet of air said one selected microfiche into said X-Y positioning means from said storage means;

return air jet means for carrying in a jet of air said one selected microfiche back into said storage means from said X-Y positioning means;

transporter means for guiding said one selected microfiche between said storage means and said X-Y positioning means when said one selected microfiche is carried therethrough by said access air jet means or said return air jet means.

2. The microfiche storage and display unit of claim 1 wherein said X-Y positioning means further includes:

Y positioning means including Y actuator means for establishing the distance said one selected microfiche will travel in said Y vertical direction in increments equal to the vertical spacing of said frames of said microfiche;

X positioning means including;

X actuator means for establishing the distance said one selected microfiche will travel in said X horizontal direction in increments equal to the horizontal spacing of said frames of said microfiche;

X positioning block means slideably mounted in said Y positioning means to move in said X horizontal direction and coupled to said X actuator means for establishing the distance in said X horizontal direction that said one selected microfiche is moved within said X-Y positioning means by said X-Y positioning air jet means.

3. The microfiche storage and display unit of claim 2 in which said Y positioning means further includes a member coupled to said Y actuator means and having opposing front and back fingers for holding said one selected microfiche and for moving in a freely sliding Y vertical direction within said transporter means.

4. The microfiche storage and display unit of claim 2 wherein said access air jet means includes a plurality of substantially downwardly directed A1 air jets arranged along said transporter means for carrying said one selected microfiche downwardly from said storage means into said X-Y positioning means.

5. The microfiche storage and display unit of claim 4 wherein said X-Y positioning air jet means includes a plurality of substantially horizontally directed A2 air jets for carrying said one selected microfiche horizontally against said X positioning block means.

6. The microfiche storage and display unit of claim 5 wherein said return air jet means includes:

a plurality of substantially horizontally directed B1 air jets for carrying said one selected microfiche horizontally away from said X positioning block means;

a plurality of substantially upwardly directed C1 air jets for carrying said one selected microfiche upwardly away from said Y positioning means and upwardly toward said storage means; and, a plurality of substantially upwardly directed C2, C3 air jets arranged along said transporter means for carrying said one selected microfiche upwardly into said storage means.

7. The microfiche storage and display unit of claim 6 wherein said return air jet means further includes an additional plurality of substantially horizontally directed B2 air jets for carrying said one selected microfiche horizontally away from said X positioning block means and into the influence of said C1 air jets.

8. The microfiche storage and display unit of claim 7 in which said substantially horizontally directed A2, B1 air jets both have downwardly directed components for carrying said one selected microfiche to the bottom of said Y positioning means.

9. The microfiches storage and display unit of claim 8 in which said substantially upwardly directed C1 air jets have horizontally directed components for carrying said one selected microfiche into substantial vertical alignment with said storage means while within said transporter means.

10. The microfiche storage and display unit of claim 9 in which said substantially horizontally directed B2 air jets carry said one selected microfiche away from said X positioning block means and into substantial alignment with said transporter means.

11. The microfiche storage and display unit of claim 10 further including:

keyboard means for generating coded information signals in response to the actuation of the keys thereof;

translator means for translating said coded information signals for coupling fluidic signals to said X actuator means, said Y actuator means and said plurality of air jets; and, pneumatic pressure source means for providing said fluidic signals under control of said translator means for displaying the selected one of the frames of the selected one of said microfiche upon said viewing screen.

* * * * *

UNITED STATES PATENT OFFICE
CERTIFICATE OF CORRECTION

Patent No. 3,834,799 Dated September 10, 1974

Inventor(s) Robert L. Blosser et al.

It is certified that error appears in the above-identified patent and that said Letters Patent are hereby corrected as shown below:

Column 10, lines 19 and 20, claim 6, "upwardly" should read -- horizontally --; line 39, claim 9, "microfiches" should read -- microfiche --.

Signed and sealed this 5th day of November 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE : 869-930